US012760699B2

(12) United States Patent
Rolland et al.

(10) Patent No.: US 12,760,699 B2
(45) **Date of Patent: *Oct. 13, 2026**

(54) CHEMICALLY RESISTANT INSERTS AND/OR SPACERS FOR AN INTAKE MANIFOLD THAT ENABLE FLOW OF COOLANT FLUID AND KITS HAVING THE SAME

(71) Applicant: Managed Programs, LLC, Auburn Hills, MI (US)

(72) Inventors: Francis Vincent Rolland, Rochester Hills, MI (US); Tim Lee Collins, Oxford, MI (US); Caleb Brownlow Newman, Troy, MI (US); Krisztian Toth, Clarkston, MI (US)

(73) Assignee: MANAGED PROGRAMS, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/081,529

(22) Filed: Mar. 17, 2025

(65) Prior Publication Data

US 2025/0250953 A1 Aug. 7, 2025

Related U.S. Application Data

(63) Continuation of application No. 18/584,237, filed on Feb. 22, 2024, now Pat. No. 12,253,054.

(Continued)

(51) Int. Cl.

| | |
|---|---|
| ***F02M 35/10*** | (2006.01) |
| ***F02M 35/104*** | (2006.01) |
| *F02B 75/18* | (2006.01) |

(52) U.S. Cl.

CPC ...... *F02M 35/10242* (2013.01); *F02M 35/10* (2013.01); *F02M 35/10321* (2013.01); (Continued)

(58) Field of Classification Search

CPC ....... F02M 35/10242; F02M 35/10321; F02M 35/10; F02M 35/104; F02M 35/10327; F02B 75/18

See application file for complete search history.

(56) References Cited

U.S. PATENT DOCUMENTS

| | | | | |
|---|---|---|---|---|
| 8,156,913 B2 * | 4/2012 | Schlicker | ............. | F02M 35/116 123/184.61 |
| 2005/0061266 A1 * | 3/2005 | Kapala | ................. | F02M 35/116 123/41.74 |

(Continued)

*Primary Examiner* — Syed O Hasan

(74) *Attorney, Agent, or Firm* — FisherBroyles, LLP; Susan M. Oiler

(57) ABSTRACT

Intake manifolds for an internal combustion engine include a first insert configured as a port cap that has a bottom surface defining a first perimeter recess configured to receive a first sealing member, a second insert configured as a port cap that has a bottom surface defining a second perimeter recess configured to receive a second sealing member, and a main body having a first set of runners extending in a first direction therefrom and a second set of runners extending in an opposite direction therefrom. Both the first set of runners and the second set of runners each terminate at a back end with a flange that defines a socket configured to receive one of the first and second inserts, respectively. The first insert and the second insert are seated in their respective socket, and each are made of a material that is chemically resistant to coolant fluid.

20 Claims, 13 Drawing Sheets

Related U.S. Application Data

(60) Provisional application No. 63/597,771, filed on Nov. 10, 2023.

(52) U.S. Cl.
CPC .... *F02M 35/10327* (2013.01); *F02M 35/104* (2013.01); *F02B 75/18* (2013.01)

(56) References Cited

U.S. PATENT DOCUMENTS

| | | | | |
|---|---|---|---|---|
| 2006/0254272 | A1 * | 11/2006 | Petutsching | F01P 3/02<br>123/41.82 R |
| 2014/0230797 | A1 * | 8/2014 | Meshenky | F02M 35/10268<br>123/542 |

* cited by examiner

CHEMICALLY RESISTANT INSERTS AND/OR SPACERS FOR AN INTAKE MANIFOLD THAT ENABLE FLOW OF COOLANT FLUID AND KITS HAVING THE SAME

RELATED APPLICATIONS

This application is a continuation of U.S. nonprovisional application Ser. No. 18/584,237, filed Feb. 22, 2024, which claims the benefit of U.S. provisional Application No. 62/597,771, filed Nov. 10, 2023, which is incorporated herein by reference in its entirety.

TECHNICAL FIELD

This application relates in general to intake manifolds for vehicle engines that utilize a coolant fluid, and more particularly, to inserts positionable between the manifold and/or coolant crossover or other cooling passage, plug, connector, or connection and the cylinder heads, where the inserts are each configured to hold a gasket seal and are made of a material that is chemically resistant to coolant fluid.

BACKGROUND

In automotive engines, coolant crossovers are commonly present on V-type internal combustion engine. Coolant crossovers carry the engine coolant fluid from one bank or side of the engine to the opposite bank for cooling during engine operation. The coolant crossover is typically a separate component attached or mounted to an intake manifold by a plurality of fasteners, such as bolts. One example of an intake manifold and coolant crossover assembly is disclosed in U.S. Pat. No. 6,945,199.

Turning now to FIGS. 1 and 2, photographs of deterioration caused by long term exposure to coolant fluid, such as ethylene glycol, are shown for intake manifolds having a polymer body, e.g., nylon. The nylon body formed a recessed seat (S) for receipt of a sealing member (not shown) therein. The innermost wall of the recessed seat (S) in both FIG. 1 and FIG. 2 experienced deterioration, which lead to a coolant leak at the seal.

Referring again to U.S. Pat. No. 6,945,199, one approach to solve this problem is presented, best seen in FIG. 5A thereof, in which a coolant crossover 56 made of metal is redesigned to have a flange 61 extending therefrom to define the innermost wall of the seal recess 80 for the sealing member 78. This flange has direct contact to the cylinder head 12A and the intake manifold polymer body 52 is shaped to define an opening 68 in which the flange 61 of the coolant crossover 56 is seated to position the sealing member 78 radially therebetween. This solution requires a new design for both the intake manifold and the coolant crossover, which is an expensive solution. This solution only addresses the front end of the intake manifold at the coolant crossover. There is no solution for the presented for the plug and other connections at the back end of the intake manifold.

Another attempted solution is presented in U.S. Pat. No. 8,156,913, which molds a sleeve of polyphenylene sulfide inside the water crossover's main passage 46, best seen in FIG. 4 thereof. While this design will allow the main body of the coolant crossover to be made of a cheaper polymer, it will not solve the deterioration problem for the innermost wall of the seal recess. As seen in FIG. 4, the innermost wall of the seal recess is still formed at least partially of the cheaper polymer material defining the main body of the coolant crossover. This will deteriorate over time and the seal will still fail.

There is a need for a solution the forms the innermost wall of the seal seat of a chemically resistant material without requiring a redesign of the coolant crossover, so that expensive aluminum coolant crossovers can be retained during repair of the intake manifold. The solution presented herein protects all the coolant passage seal supports from exposure to coolant fluid and provides a design for reuse of aluminum coolant crossovers and in the future.

SUMMARY

In a first aspect, intake manifolds for an internal combustion engine are disclosed that include a first insert configured as a port cap having a bottom surface defining a first perimeter recess configured to receive a first sealing member, a second insert configured as a port cap and having a bottom surface defining a second perimeter recess configured to receive a second sealing member, and a main body having a first set of runners extending in a first direction therefrom and a second set of runners extending in an opposite direction therefrom, wherein both the first set of runners and the second set of runners each terminate at a back end with a flange that defines a socket configured to receive one of the first and second inserts, respectively, and in which one of the first insert and second insert are seated. The first insert and the second insert are made of a material that is chemically resistant to coolant fluid, for example, polyphenylene sulfide or a metal or metal alloy. The main body can be made of a polyamide or polypropylene.

In one embodiment, the first insert has a top surface from which an elongate spout extends and from which a fastener post extends. The flange of the first set of runners includes a mating hole for receipt of the fastener post for a deformation fit therewith. The elongate spout can be open for fluid flow therethrough. In the same or a different embodiment, the bottom surface of the second insert has an outer wall having a beginning and an end and an endless inner wall defining the recess for a second sealing member.

In another aspect, the intake manifold described above can additionally have both the first set of runners and the second set of runners each terminating at a front end with a flange that defines a socket configured to receive a third insert and a fourth insert, respectively. The third insert is seated in the flange of the first set of runners and defines an open port, has a top surface defining a third perimeter recess about the open port configured to receive a third sealing member, and has a bottom surface defining a fourth perimeter recess about the open port configured to receive a fourth sealing member. The fourth insert is seated in the flange of the second set of runners and defines a dual port, has a top surface defining a fifth perimeter recess about the dual ports configured to receive a fifth sealing member, and has a bottom surface defining a sixth perimeter recess that surrounds and extends between the ports of the dual port configured to receive a sixth sealing member. The third insert and the fourth insert are made of a material that is chemically resistant to coolant fluid, for example, polyphenylene sulfide or a metal or metal alloy. The main body can be made of a polyamide or polypropylene.

The third insert and the fourth insert can each have a key-keyway or keyway-key connection to the respective socket. Separately or in addition to key-keyway connection, the third insert and the fourth insert can have a deformation fit in their respective socket.

In all embodiments, the top surface of the third insert and the fourth insert and a top surface of their respective flanges of the intake manifold are configured to mate with a coolant crossover.

In another aspect, the intake manifold described above can include a coolant crossover juxtaposed to and attached or integral with the main body thereof. The coolant crossover has a first end more proximate the first set of runners and a second end more proximate the second set of runners. The intake manifold includes a first interface spacer attached to the first end of the coolant crossover, and a second interface spacer attached to the second end of the coolant crossover. The first interface spacer and the second interface spacer are each made of a material that is chemically resistant to coolant fluid, for example, polyphenylene sulfide or a metal or metal alloy. The main body can be made of a polyamide or polypropylene.

The first interface spacer defines a through-port and has a top surface defining a third perimeter recess about the through-port configured to receive a third sealing member and a bottom surface defining a fourth perimeter recess about the through-port configured to receive a fourth sealing member. The second interface spacer defines dual through-ports and has a top surface defining a fifth perimeter recess about and between the dual through-ports configured to receive a fifth sealing member and a bottom surface defining a sixth perimeter recess that about and between the dual through-ports configured to receive a sixth sealing member.

In another aspect, kits are disclosed herein that include a first insert configured as a port cap having a bottom surface defining a first perimeter recess configured to receive a first sealing member, a second insert configured as a port cap and having a bottom surface defining a second perimeter recess configured to receive a second sealing member, and an intake manifold comprising a main body having a first set of runners extending in a first direction therefrom and a second set of runners extending in an opposite direction therefrom. Both the first set of runners and the second set of runners each terminate at a back end with a flange that defines a socket configured to receive one of the first and second inserts, respectively. The first insert and the second insert are made of a material that is chemically resistant to coolant fluid, for example, polyphenylene sulfide or a metal or metal alloy. The main body can be made of a polyamide or polypropylene.

In one embodiment, the first insert has a top surface from which an elongate spout can extends, the elongate spout being open or closed.

The kit can also include the first sealing member and the second sealing member.

In one embodiment, both the first set of runners and the second set of runners of the intake manifold terminate at a front end with a flange that defines a socket configured to receive a third insert and a fourth insert, respectively. The kit also includes the third insert which defines an open port, has a top surface defining a third perimeter recess about the open port configured to receive a third sealing member, and has a bottom surface defining a fourth perimeter recess about the open port configured to receive a fourth sealing member. The kit also include the fourth insert which defines a dual port, has a top surface defining a fifth perimeter recess about the dual ports configured to receive a fifth sealing member, and has a bottom surface defining a sixth perimeter recess that surrounds and extends between the ports of the dual port configured to receive a sixth sealing member. The third insert and the fourth insert are made of a material that is chemically resistant to coolant fluid, for example, polyphenylene sulfide or a metal or metal alloy.

The kit can also include the third sealing member through a sixth sealing member.

In another embodiment, the kit can include a coolant crossover attachable or integral with the main body of the intake manifold, a first spacer attachable to a first end of the coolant crossover, and a second spacer attachable to the second end of the coolant crossover. The first interface spacer and second interface spacer are each made of a material that is chemically resistant to coolant fluid. The first spacer defines a through-port, has a top surface defining a third perimeter recess about the through-port configured to receive a third sealing member, and has a bottom surface defining a fourth perimeter recess about the through-port configured to receive a fourth sealing member. The second spacer defines dual through-ports, has a top surface defining a fifth perimeter recess about and between the dual through-ports configured to receive a fifth sealing member, and has a bottom surface defining a sixth perimeter recess that about and between the dual through-ports configured to receive a sixth sealing member.

The kit also includes a plurality of sealing members, one each configured to seat in one of the first through sixth perimeter recesses.

DETAILED DESCRIPTION

Figure 1:
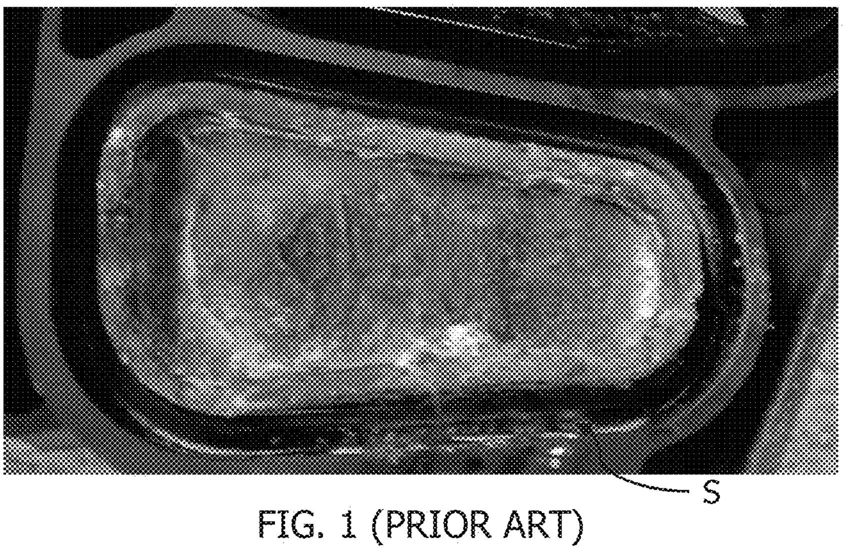
FIG. 1 (PRIOR ART)
FIG. 1 is a photograph of a deteriorated cap and innermost wall of a seal seat of an intake manifold resulting from exposure to coolant fluid.
Figure 2:
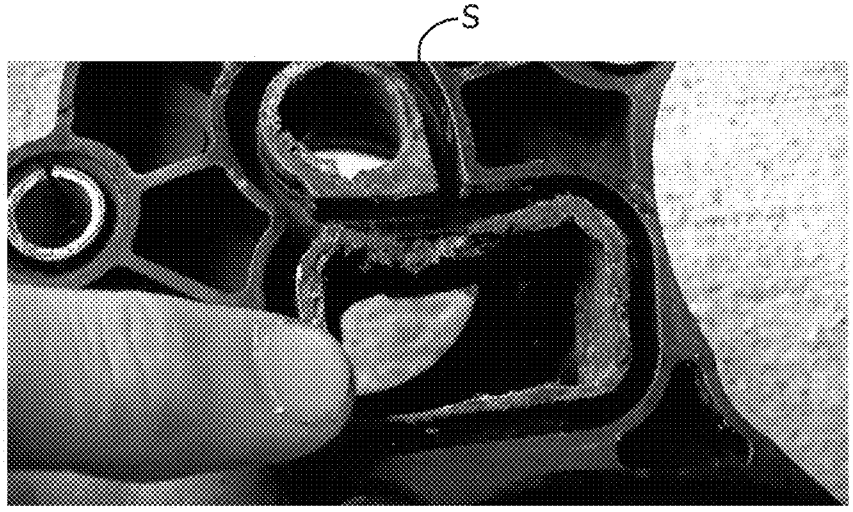
FIG. 2 (PRIOR ART)
FIG. 2 is a photograph of a deteriorated innermost wall of a seal seat of another intake manifold resulting from exposure to coolant fluid.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

A basic internal combustion engine system 100 is configured for combusting fuel vapor accumulated in at least one component thereof and includes a multi-cylinder internal combustion engine 110. The engine system 100 receives air from an air intake 112, which may include an air filter 113 and may include a turbocharger (or a supercharger). The compressor of the turbocharger receives air from the air intake 112, compresses the air, and directs a flow of compressed air (or boosted air) downstream through a charge air cooler or intercooler and then to a throttle. The throttle controls fluid communication between the compressor and the intake manifold of the engine. The throttle is operable using known techniques to vary an amount of intake air provided to the intake manifold and the cylinders of the engine. The intake manifold is configured to supply intake air or an air-fuel mixture to a plurality of combustion chambers of engine located within the engine block. The combustion chambers are typically arranged above a lubricant-filled crankcase such that reciprocating pistons of the combustion chambers rotate a crankshaft located in the crankcase. In some engines, a first cylinder block and a second cylinder block and heads form a valley, often referred to as a V-engine. The valley is an open space beneath the intake manifold which, in some examples, may be used for various engine components, such as air, exhaust, and/or engine coolant conduits. Additionally, open space in the valley may assist in cooling of the engine.

Each cylinder may receive intake air from the intake manifold via an intake port located on the cylinder head and may exhaust combustion gases via an exhaust port located on the cylinder head. Thus, each cylinder head includes a plurality of exhaust ports and a plurality of intake ports. The exhaust ports are positioned on sides of the cylinder heads opposing the valley in an outbound configuration. For example, outbound exhaust manifolds leading to a tail pipe may be coupled to the exhaust ports on cylinder heads of the banks. The intake ports are positioned on the sides of the cylinder heads adjacent to the valley in an inbound configuration.

Figure 3:
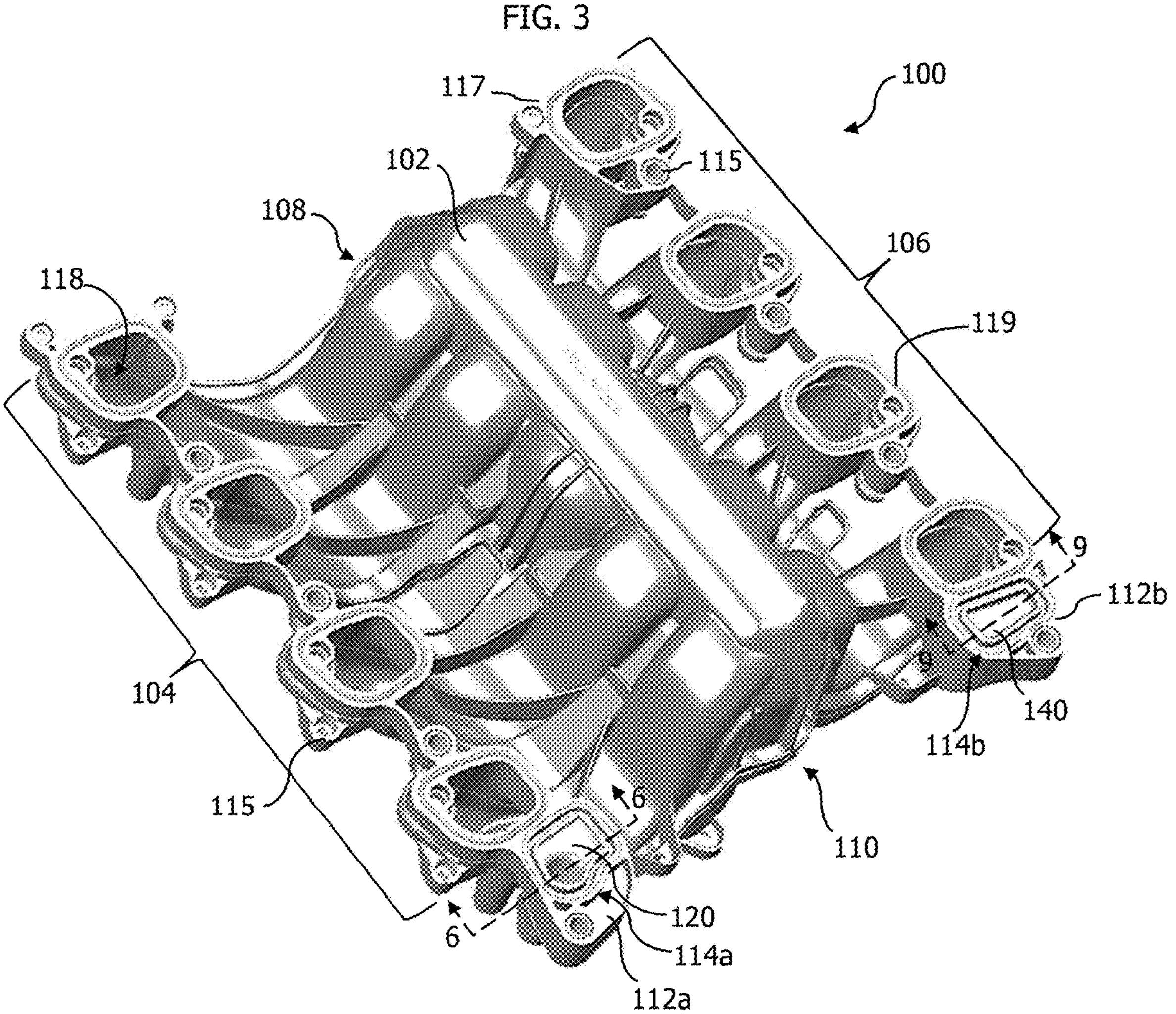
FIG. 3 is a bottom perspective view of a first embodiment of an intake manifold assembly having a kit of inserts seated in the back ports of the intake manifold.

Referring to FIG. 3, an intake manifold 100 for an internal combustion engine is shown upside down so that the inserts 120, 140 are visible. The intake manifold has a main body 102 having a front end 108 and a back end 110 (labeled in the figures relative to how the intake manifold will be mounted on the cylinder head of the engine) and having a first set of runners 104 extending in a first direction therefrom and a second set of runners 106 extending in an opposite direction therefrom. The first set of runners 104 and the second set of runners 106 each terminate at their back end 110 with a flange 112*a*, 112*b* that each define a socket 114*a*, 114*b* configured to receive a first insert 120 and a second insert 140, respectively, and in which said first insert 120 and second insert 140 are seated. Each runner in any one of the sets of runners 104, 106 terminate with an interface 117 defining an air outlet 118 configured to mate with one of the cylinders of the internal combustion engine. Each interface 117 includes a sealing member 119 to form a fluid tight seal between each runner and its respective port of the engine cylinder head.

Intake manifold 100 may be mechanically coupled to the intake ports on the cylinder head(s) using mechanical fasteners. For example, intake manifold 100 may be attached to the cylinder heads by a plurality of attachments 115 located adjacent to outer edges of intake manifold. Intake manifold 100 may further include various mounting components, outlets, etc. which may be coupled to various engine sensors, serve as a mounts for engine components, or secure the intake manifold to the engine. For example, a carburetor, throttle body, coolant crossover, fuel injectors and/or other components of the engine may be fastened to the intake manifold, e.g., via mounting holes shown in the figures. As another example, a manifold absolute pressure (MAP) sensor, a mass air flow (MAF) sensor, an air/fuel sensor, and/or other engine diagnostic devices may be coupled to the intake manifold.

Each insert described herein is made of a material that is chemically resistant to coolant fluid. Some non-limiting example materials include metal and/or metal alloys, such as aluminum or brass. The material can also be a synthetic polymer such as polyaromatic sulfide, for example, polyphenylene sulfide (PPS) and polyphenylene sulfide alloys, a polyphthalamide (PPA), a polybutylene terephthalate (PBT), or a polyoxymethylene (POM). Example polyphenylene sulfides are described in U.S. Pat. No. 8,156,913 and are incorporated herein by reference. Using such materials for the inserts enables the intake manifold to be molded of a more technically suitable material (one having a suitable elongation at rupture, transformation characteristics, etc.) and less expensive material, in particular, a polymeric material, such as, but not limited to, nylon 6, nylon 4/6, nylon 6/6, and/or other commercially available plastics that will provide fluid tight seal integrity at engine operational pressure differentials and are suitable for engine environmental conditions, such as temperatures between −40° C. to 120° C., as well as road and weather conditions and debris. In one embodiment, the intake manifold is made of a polyamide, such as a nylon. In another embodiment, the intake manifold is made of polypropylene. Typically, the polymers used for the intake manifold include fillers, such as glass fibers. The glass fibers can comprise 30% to 35% by weight of the polymer. In some examples, intake manifold may be formed at least partially from resin impregnated with a matrix material such a carbon fiber cloth. The composite intake manifold may be formed as one piece or as multiple pieces joined together in a post-process. For example, one or more pieces of the manifold may be formed using injection molding or blow-molding processes. The one or more pieces of the manifold may be joined together by a suitable welding process, e.g., using a vibration welding technique, and/or by using bolts, gaskets, or other suitable hardware.

Figure 4:
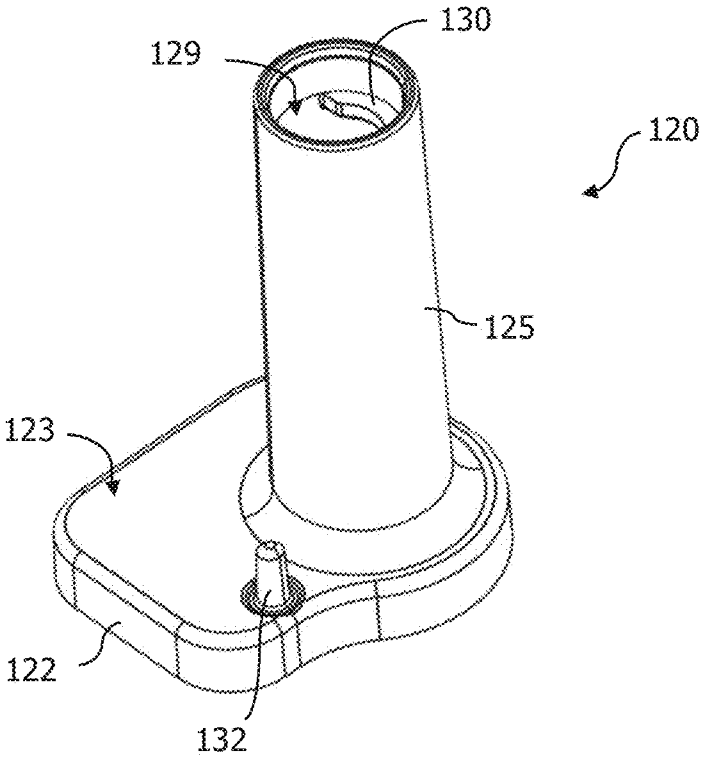
FIG. 4 is a top perspective view of a first insert for an intake manifold.
Figure 5:
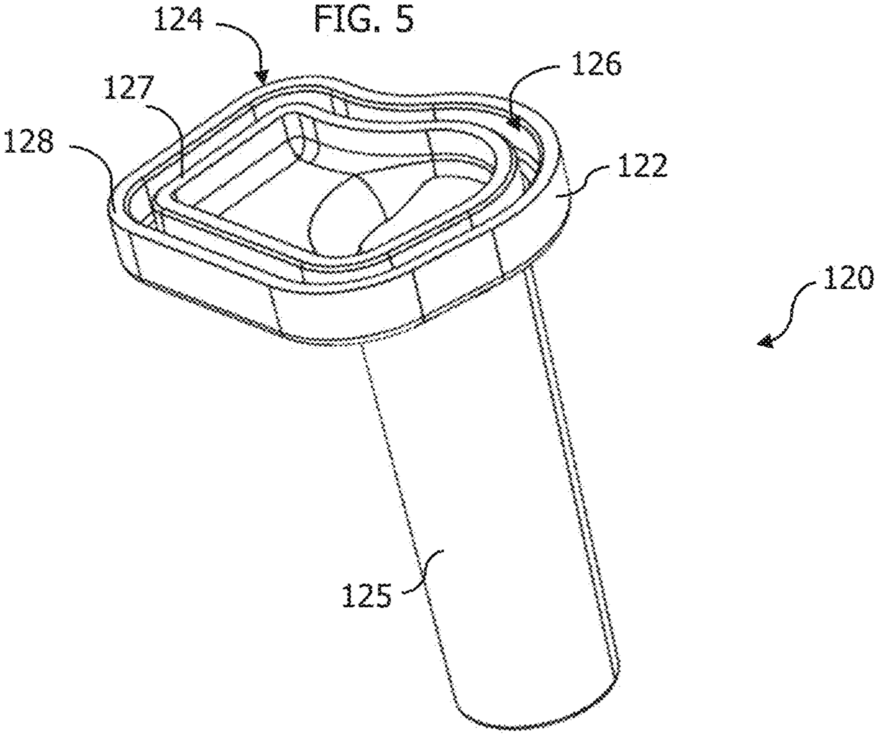
FIG. 5 is a bottom perspective view of the first insert for an intake manifold.
Figure 6:
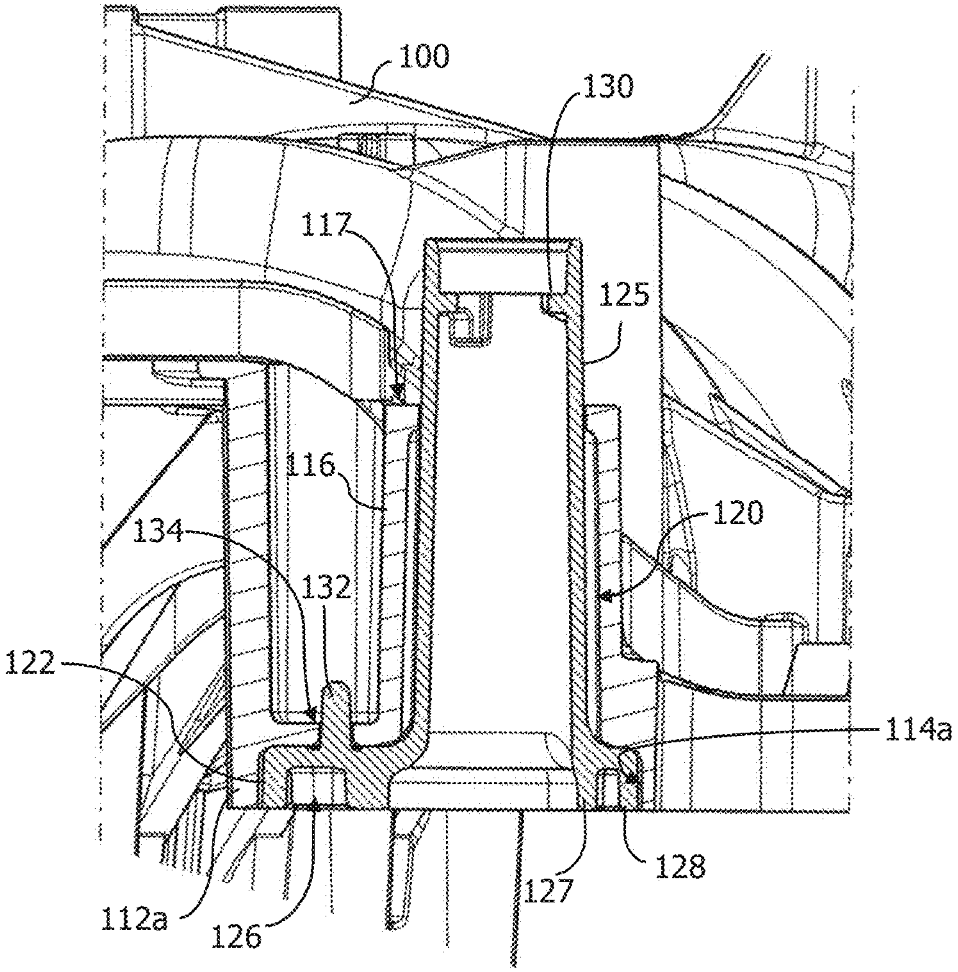
FIG. 6 is a cross-sectional view along the line 6-6 in FIG. 3.

Turning to FIGS. 4-6, the first insert 120 is configured as a port cap 122, has a top surface 123, and has a bottom surface 124 defining a first perimeter recess 126 configured to receive a first sealing member. The first perimeter recess 126 has an inner wall 127, which will be in direct contact with coolant fluid, and an outer wall 128. A sealing member when seated in the first perimeter recess 126 is available to form a fluid tight seal with the engine cylinder head when the intake manifold is seated thereon. The first insert includes an elongate spout 125 extending outward away from the top surface 123. The elongate spout 125 can be open or closed, depending upon the engine in which the intake manifold is installed. In FIGS. 4-6, the elongate spout 125 has an open distal end 129 for fluid flow therethrough and includes an internal shoulder 130 limiting the depth of insertion of another conduit therein.

As seen in the figures, the port cap 122 includes a fastener post 132 extending outward away from the top surface 123. The fastener post 132 is configured to seat in a mating hole 134 (FIG. 6) for a deformation fit therewith. In another embodiment, the port cap 122 can be secured in the socket using an adhesive only or in addition to the fastener post 132. In yet another embodiment, the fastener post 132 could be replaced with a self-forming screw (also known as a self-tapping screw). The self-forming screw is a threaded fasteners that displaces material during installation by being driven directly into the intake manifold without the presence of a receiving aperture. These alternatives are equally applicable to all inserts disclosed herein.

In the assembled, cross-sectional view of FIG. 6, the top surface of the first insert 120 faces into the socket 114*a* of the intake manifold 100. The intake manifold's flange 112*a* includes an elongate port 116 in which the elongate spout 125 of the first insert 120 is received. The elongate port 116 extends from the flange 112*a* in a direction away from the engine cylinder head. The elongate spout 125 has a length that is longer than the elongate port 116 such that the distal end of the elongate spout 125 protrudes beyond a terminal end 117 of the elongate port 116.

The first sealing member 190, shown in FIG. 6, and any of the other sealing members present herein are elastomeric in nature and may be formed of an elastomer. One suitable elastomers is fluorocarbon elastomer material, known by the abbreviation FKM and sometimes called fluorine rubber or fluoro-rubber. FKM seals have high-temperature sustainability, chemical resistance, and mechanical strength, which make then suitable for internal combustion engines and possible exposure to fuel therefrom. FKM polymer is made from vinylidene monomers with a high concentration of fluorine and carbon-based elastomers. The crosslinking mechanism between the monomers, fluorine molecules, and carbon make this material highly suitable for applications exposed to chemicals and high temperature. Other suitable elastomers include silicone rubber and hydrogenated nitrile butadiene rubber (HNBR). HNBR is made via selective hydrogenation of the NBR butadiene groups which improves the temperature and ozone resistance considerably. HNBR is widely known for its physical strength and retention of properties after long-term exposure to heat, oil, and chemicals. HNBR has better heat resistance; oxidation resistance; tensile strength and abrasion resistance than standard nitrile (NBR).

Figure 7:
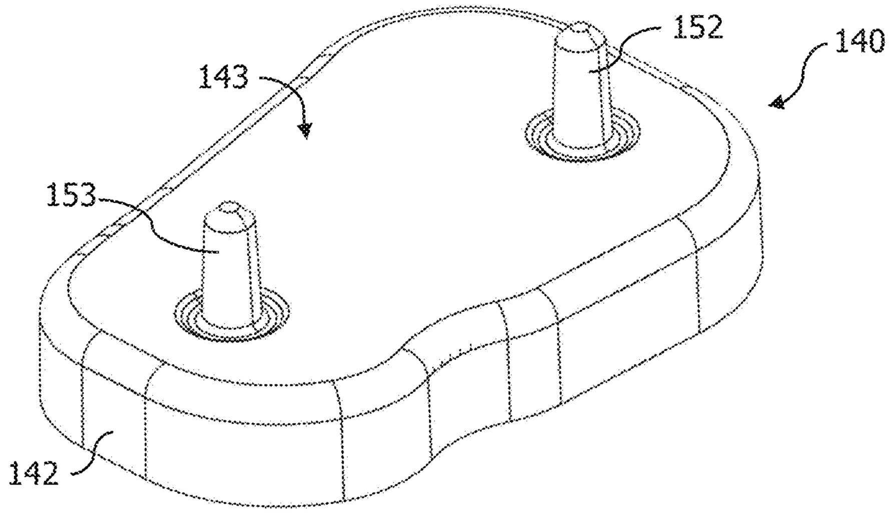
FIG. 7 is a top perspective view of a second insert for an intake manifold.
Figure 8:
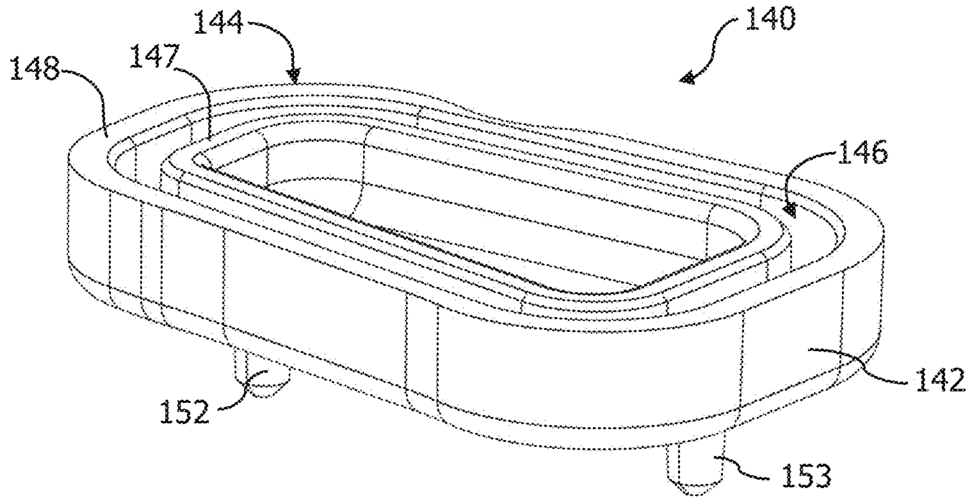
FIG. 8 is a bottom perspective view of the second insert for an intake manifold.
Figure 9:
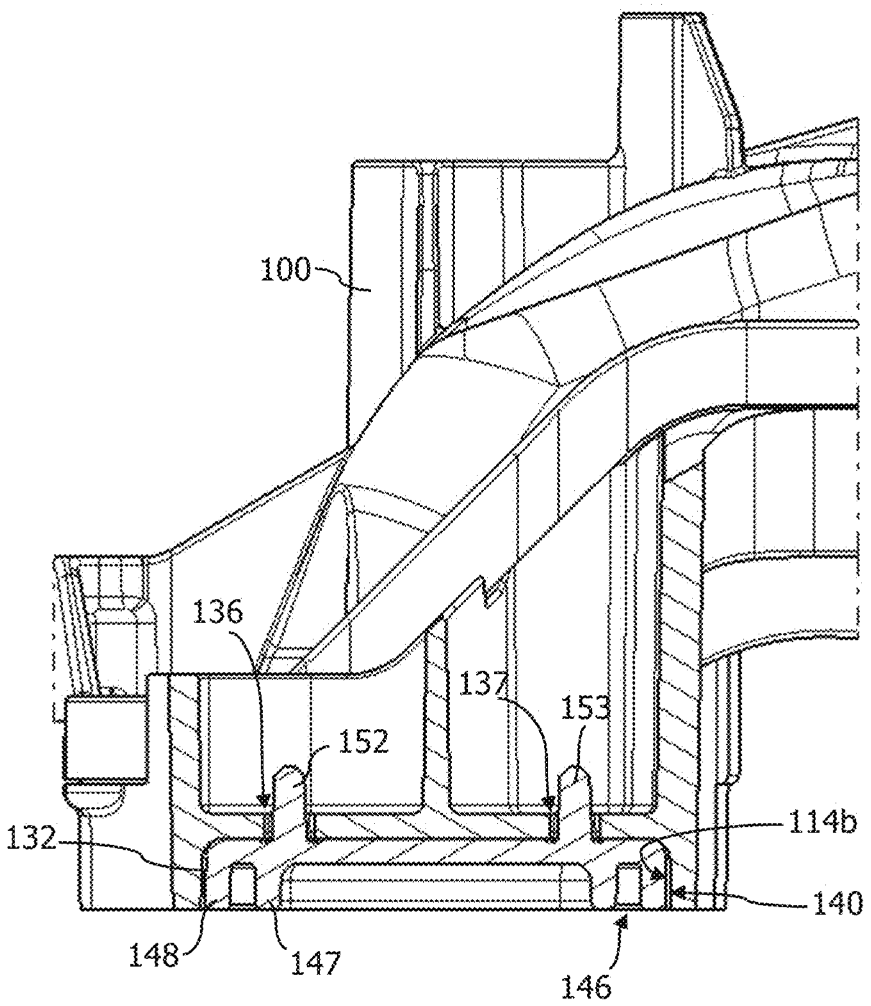
FIG. 9 is a cross-sectional view along the line 9-9 in FIG. 3.

Turning to FIGS. 7-9, the second insert 140 is configured as a port cap 142, has a top surface 143, and has a bottom surface 144 defining a second perimeter recess 146 configured to receive a second sealing member 192 (FIG. 9). The second perimeter recess 146 has an inner wall 147, which will be in direct contact with coolant fluid, and an outer wall 148. A sealing member when seated in the second perimeter recess 146 is available to form a fluid tight seal with the engine cylinder head when the intake manifold is seated thereon. The port cap 142 includes a fastener post 152 extending outward away from the top surface 143, and optionally a second fastener post 153 also extending outward away from the top surface 143. The fastener post 122 is configured to seat in a mating hole 136, 137, respectively, (FIG. 9) for a deformation fit therewith. In this assembled, cross-sectional view, the top surface 143 of the first insert 140 faces into the socket 114*b* of the intake manifold 100.

Figure 10:
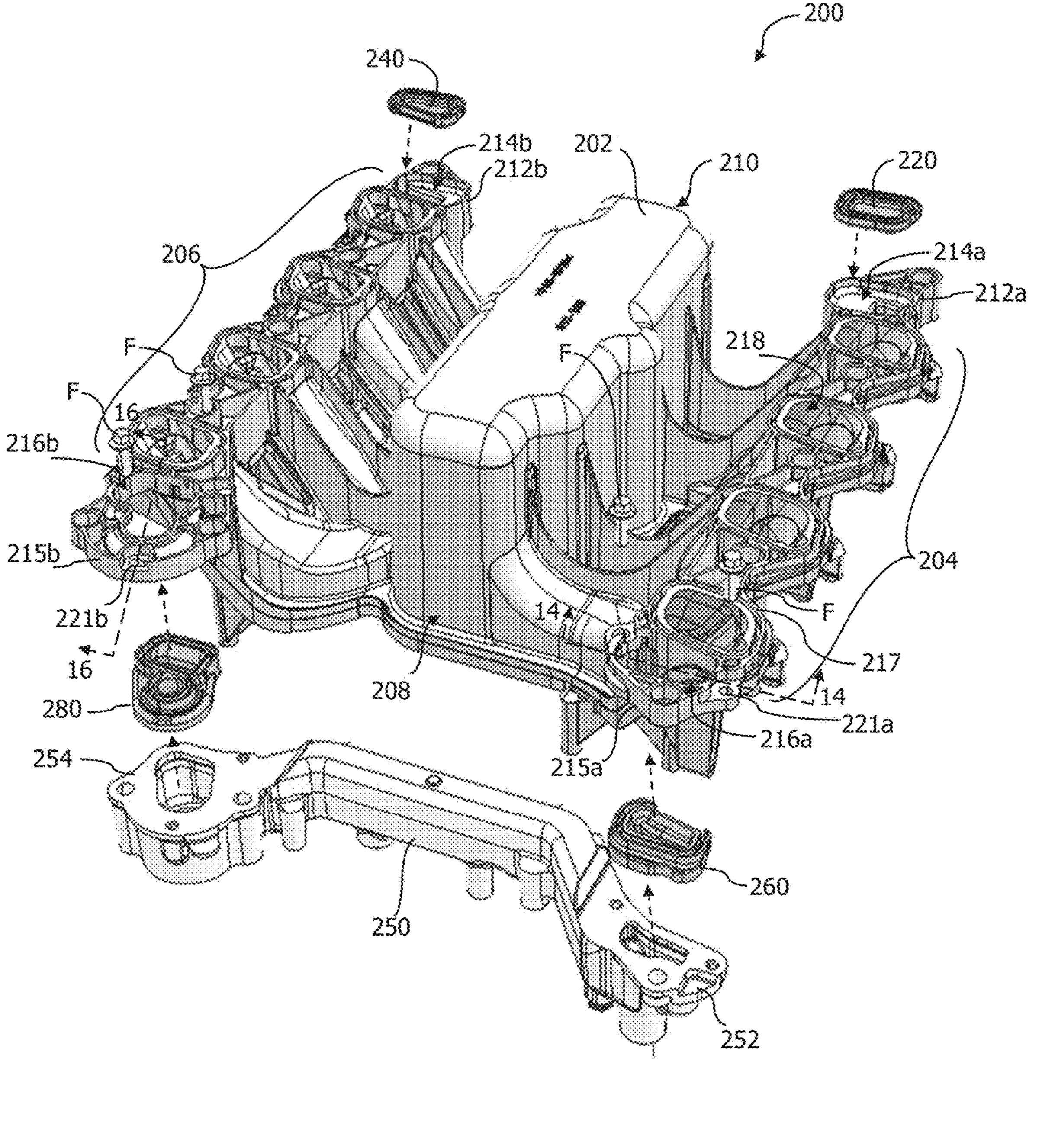
FIG. 10 is a front perspective view of a second embodiment of an intake manifold and coolant crossover that includes a kit of inserts for the back ports and inserts for front flanges of the intake manifold.

The intake manifold of FIG. 3 does not include a coolant crossover, but can include a cooling passage, plug, connector, or connection for the cylinder heads. Alternately, the intake manifold can include the coolant crossover for example as shown in FIGS. 10 and 17 and/or other cooling passage, plug, connector, or connection for the cylinder heads. Turning now to the embodiment of FIGS. 10-16, an intake manifold 200 for an internal combustion engine is shown that has a main body 202 having a front end 208 and a back end 210, has a first set of runners 204 extending in a first direction therefrom, and a second set of runners 206 extending in an opposite direction therefrom. The first set of runners 204 and the second set of runners 206 each terminate at their back ends with a flange 212*a*, 212*b* that each define a socket 214*a*, 214*b* configured to receive a first insert 220 and a second insert 240, respectively, and each terminate at their front end with a flange 215*a*, 215*b* that defines a socket 216*a*, 216*b* configured to receive a third insert 260 and a fourth insert 280, respectively. Each runner in any one of the sets of runners 204, 206 terminate with an interface 217 defining an air outlet 218 configured to mate with one of the cylinders of the internal combustion engine. Each interface 217 includes a sealing member 219 to form a fluid tight seal between each runner and its respective port of the engine cylinder head.

Figure 11:
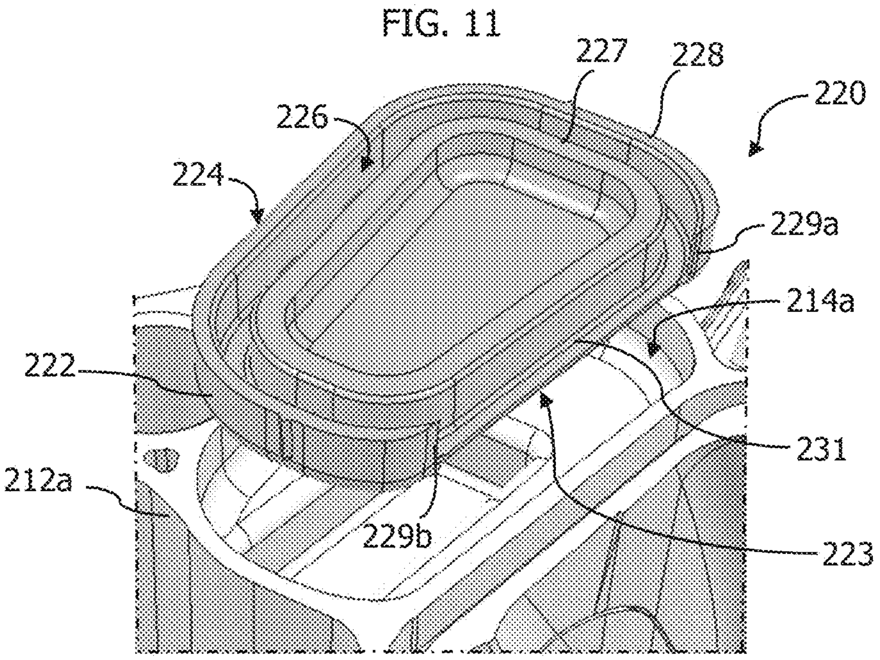
FIG. 11 is a bottom perspective view of a first insert for the intake manifold of FIG. 10.
Figure 12:
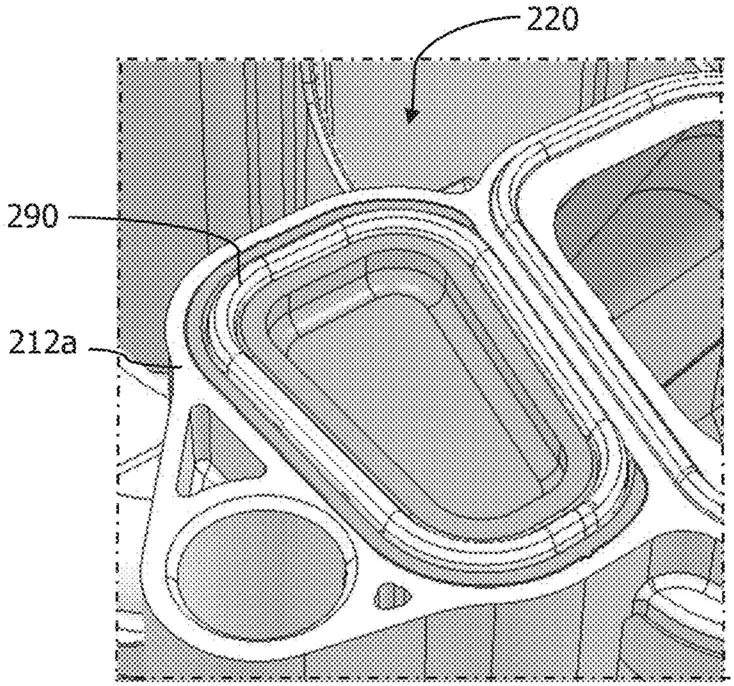
FIG. 12 is an assembled, bottom perspective view of a first insert for the intake manifold of FIG. 10 having a first sealing member seated therein.

The first insert 220 may be the same the first insert 120 described above for the first embodiment. Alternately, the first insert 220 may be a port cap 222 only, i.e., no elongate spout is present. The first insert 220 include the other features of the first insert cap 120 of the first embodiment, such as the fastener post. Referring now to FIGS. 11 and 12, the first insert 220 is configured as a port cap 222, has a top surface 223, and has a bottom surface 224 defining a first perimeter recess 226 configured to receive a first sealing member. The first perimeter recess 226 has an endless inner wall 227, which will be in direct contact with coolant fluid, and an outer wall 228 that has a beginning 229*a* and an end 229*b*. The beginning 229*a* and the end 229*b* of the outer wall 228 can be found in the same side 231 of the first insert. A first sealing member 290 when seated in the first perimeter recess 226, as shown in FIG. 12, is available to form a fluid tight seal with the engine cylinder head when the intake manifold is seated thereon.

The second insert 240 may be the same as the first insert 220 or the second insert 140 of the first embodiment discussed above.

Figure 13:
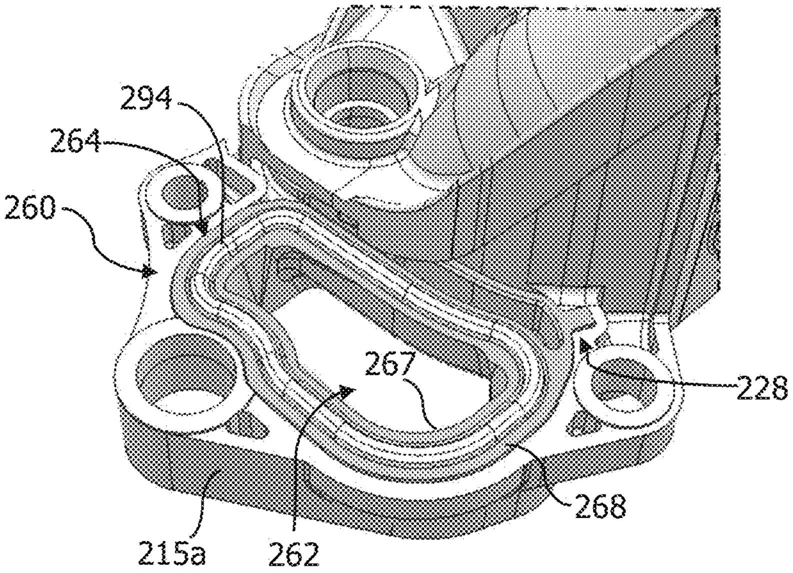
FIG. 13 is an assembled, top perspective view of the third insert for the intake manifold of FIG. 10.
Figure 14:
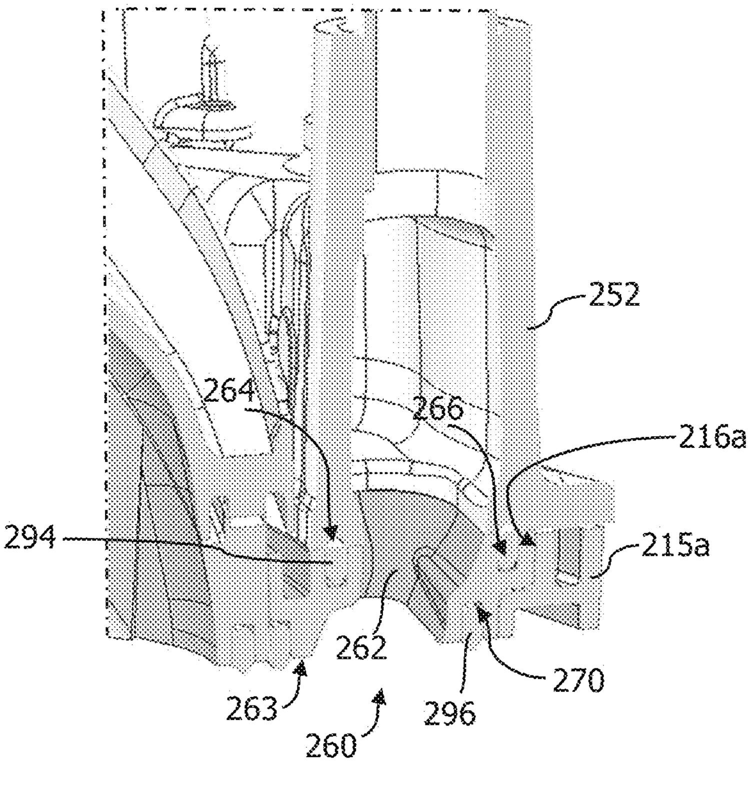
FIG. 14 is an assembled, cross-sectional view through the third insert along line 14-14 in FIG. 10.

Turning now to FIGS. 13-14, the third insert 260 is seated in the socker 216*a* of the flange 215*a* of the first set of runners 204. The third insert 260 defines a first through port 262, has a top surface 264 defining a third perimeter recess 266 (defined between an inner wall 267 and an outer wall 268) about the through port 262 configured to receive a third sealing member 294, and has a bottom surface 263 defining a fourth perimeter recess 270 about the through port 262 configured to receive a fourth sealing member 296. The bottom surface 263 is the surface that faces and first enters the socket 216*a* and in the assembled state is available to mate with the engine with a fluid tight seal. The top surface 264 faces a coolant crossover 250 and in the assembled state mates to a first end 252 of the coolant crossover 250 with a fluid tight seal.

Figure 15:
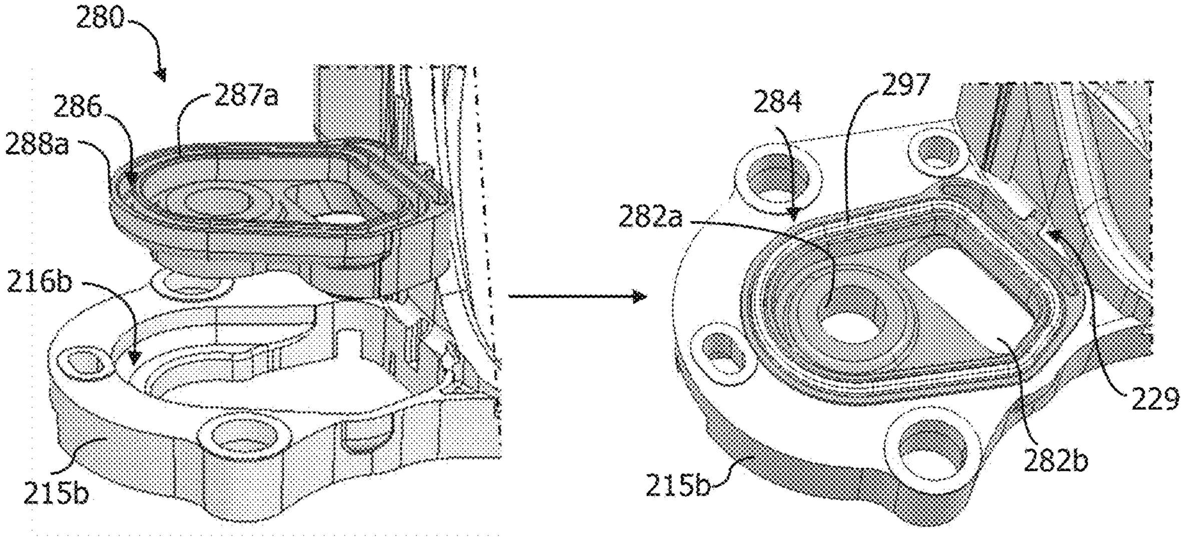
FIG. 15 is a progression from an unassembled state to an assembled state for the fourth insert for the intake manifold of FIG. 10.
Figure 16:
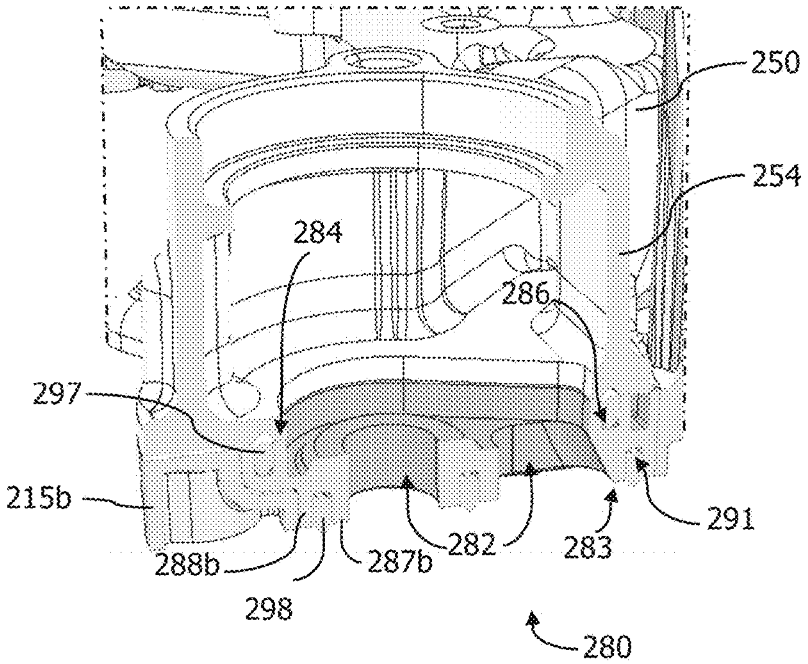
FIG. 16 is an assembled, cross-sectional view through the fourth insert along line 16-16 in FIG. 10.
Figure 17:
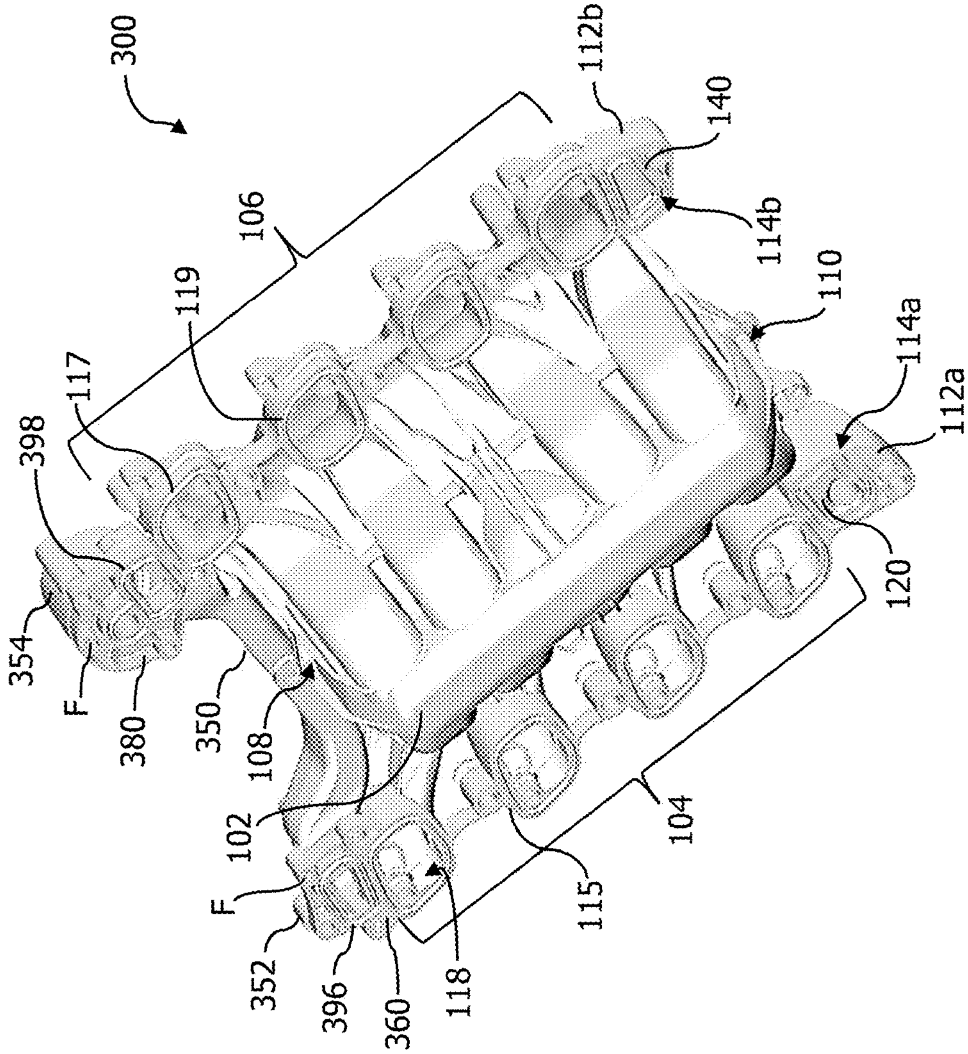
FIG. 17 is a third embodiment of an intake manifold, such as the intake manifold of FIG. 3, having a coolant crossover present and an interface spacers at each end of the coolant crossover.

Referring to FIGS. 15 and 16, the fourth insert 280 is seated in the socket 216*b* of the flange 215*b* of the second set of runners 206. The fourth insert 280 defines a dual port 282*a* and 282*b*, has a top surface 284 defining a fifth perimeter recess 286 (defined between an inner wall 287*a* and an outer wall 288*a*) about the dual ports 282 configured to receive a fifth sealing member 297 and a bottom surface 283 defining a sixth perimeter recess 291 (defined between an inner wall 287*b* and an outer wall 288*b*) that surrounds and extends between the first through port 282*a* and the second through port 282*b* (seen in FIGS. 10 and 16) configured to receive a sixth sealing member 298. As such, the sixth sealing member has general figure-8 configuration as visible in FIGS. 10 and 16. In one embodiment, the first through port 282*a* can be generally cylindrically-shaped, and the second through port 282*b* can be generally rectangularly prism-shaped. In other embodiments, the through ports 282*a* and 282*b* can any shape suitable for mating to the ports of an engine. The bottom surface 283 is the surface that faces and first enters the socket 216*b* and in the assembled state is available to mate with the engine with a fluid tight seal. The top surface 284 faces a coolant crossover and in the assembled state mates to a second end 254 of the coolant crossover 250 with a fluid tight seal.

One or more fasteners (F) can fasten the intake manifold's flanges 215*a*, 215*b*, respectively, to the first end 252 and the second end 254 of the coolant crossover 250 through apertures 221*a*, 221*b* in the flanges 215*a*, 215*b*. As seen in FIG. 13, the third insert 260 can include a key for a key-keyway connection 228 or vice versa, a keyway for a keyway-key connection to the respective socket 216*a*. The third insert 260 can have a deformation fit in the socket 216*a*. As seen in FIG. 15, the fourth insert 280 can include a key for a key-keyway connection 229 or vice versa, a keyway for a keyway-key connection to the respective socket 216*b*. The fourth insert 280 can have deformation fit in the socket 216*a*.

Each of the first through fourth inserts 220, 240, 260, and 280 can be molded, machined, thermoformed, 3-D printed, or made using sintering methods with any of the chemically resistant materials discussed above.

Turning now to FIG. 17, a third embodiment of an intake manifold 300 for an internal combustion engine is shown that has the same features as FIG. 3 with the addition of a coolant crossover 350 juxtaposed to and attached or integral with the main body 102 of the intake manifold 300 and a first interface spacer 360 attached to a first end 352 of the coolant crossover 350 and a second interface spacer 380 attached to the second end 354 of the coolant crossover. Since the intake manifold is the same as FIG. 3, it is labeled with the same numbers as FIG. 3 above and those features are as described above. The first end 352 of the coolant crossover is more proximate the first set of runners 104 and the second end 354 of the coolant crossover is more proximate the second set of runners 106.

Figure 18:
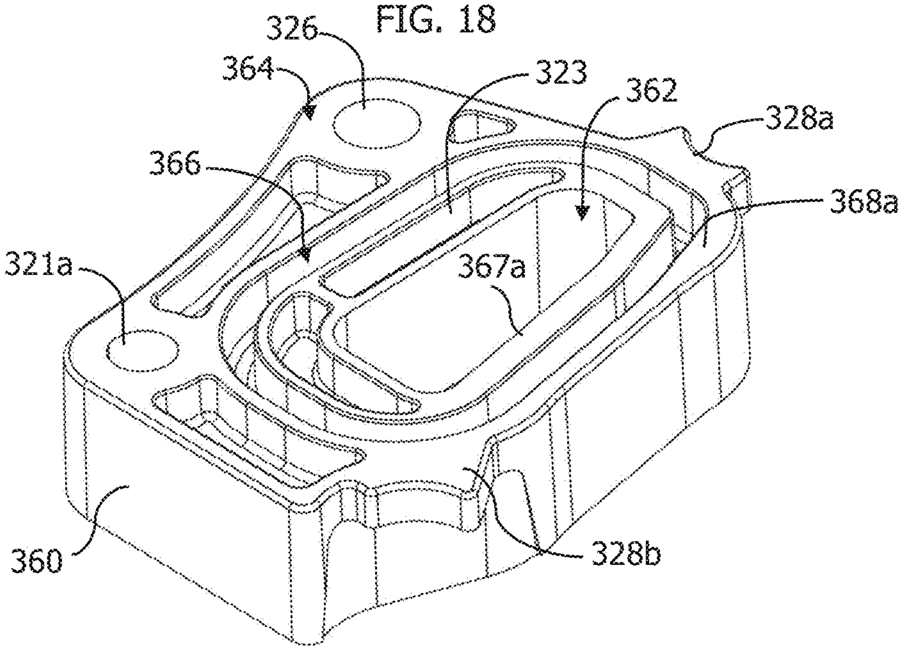
FIG. 18 is a top perspective view of a first interface spacer of FIG. 17.
Figure 19:
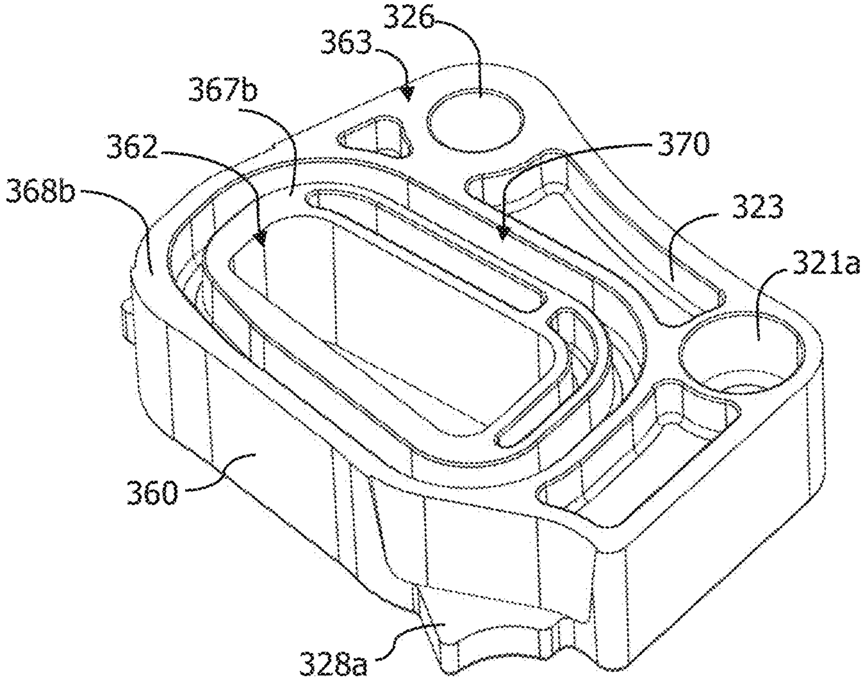
FIG. 19 is a bottom perspective view of the first interface spacer of FIG. 17.

Turning to FIGS. 18 and 19, the first interface spacer 360 has a top surface 364 configured to interface with the first end 352 of the coolant crossover 350 and a bottom surface 363 configured to interface with a port of an engine, each forming a fluid tight seal in the assembled state. The first interface spacer 360 defines a through-port 362, defines a fastener aperture 321*a* therethrough, has a top surface 364 (FIG. 18) defining a third perimeter recess 366 (defined between an inner wall 367*a* and an outer wall 368*a*) about the through-port configured to receive a third sealing member and has a bottom surface 363 (FIG. 19) defining a fourth perimeter recess 370 (defined between an inner wall 367*b* and an outer wall 368*b*) about the through-port configured to receive a fourth sealing member 396 (visible in FIG. 17). The first interface spacer 360 can include one or more registration tabs 328*a*, 328*b* configured to mate with a feature of the intake manifold or the coolant crossover to hold the interface spacer in a selected position during the fastening of the fastener (F), shown in FIG. 17. In another embodiment, rather than a registration tab 328, a key or keyway for a key-keyway connection can be present. The body of the first interface spacer 360 can include various depressions 323 in the top surface 364 and/or the bottom surface 363. These depressions 323 can provide structurant integrity to the spacer 360 and/or a reduction in weight. The depressions can be present in the inner wall 367 and/or present radially outward from the outer wall 368.

Figure 20:
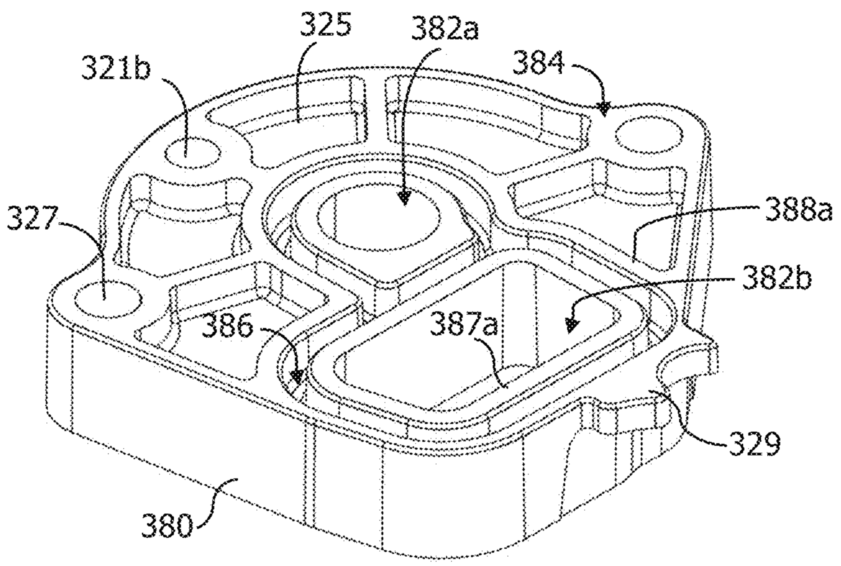
FIG. 20 is a top perspective view of the second interface spacer of FIG. 17.
Figure 21:
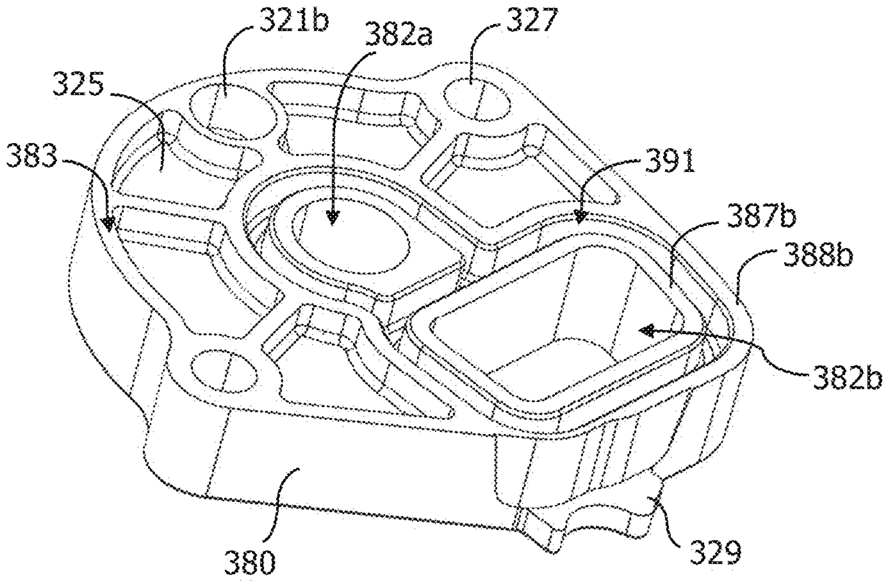
FIG. 21 is a bottom perspective view of the second interface spacer of FIG. 17.

Turning to FIGS. 20 and 21, a second interface spacer 380 has a top surface 384 (FIG. 20) configured to interface with the second end of the coolant crossover 350 and a bottom surface 383 (FIG. 21) configured to interface with a port of an engine, each forming a fluid tight seal in the assembled state. The second interface spacer 380 defines dual through-ports and the top surface 384 defines a fifth perimeter recess 386 (defined between an inner wall 387*a* and an outer wall 388*a*) about and between the dual through-ports 382*a*, 382*b* configured to receive a fifth sealing member and the bottom surface 383 defines a sixth perimeter recess 391 (defined between an inner wall 387*b* and an outer wall 388*b*) about and between the dual through-ports 382*a*, 38*b* configured to receive a sixth sealing member 396, shown in FIG. 17. As such, each of the fifth and sixth sealing members have a general figure-8 configuration. In one embodiment, the first through port 382*a* can be generally cylindrically-shaped, and the second through port 382*b* can be generally rectangularly prism-shaped. In other embodiments, the through ports 282*a* and 282*b* can any shape suitable for mating to the ports of an engine.

The second interface spacer 380 can include one or more registration tabs 329 configured to mate with a feature of the intake manifold or the coolant crossover to hold the interface spacer in a selected position during the fastening of the fastener (F), shown in FIG. 17. In another embodiment, rather than a registration tab 329, a key or keyway for a key-keyway connection can be present. The body of the second interface spacer 380 can include various depressions 325 in the top surface 364 and/or the bottom surface 363. These depressions 325 can provide structurant integrity to the spacer 380 and/or a reduction in weight. The depressions can be present radially outward from the outer walls 388*a*, 388*b*.

One or more fasteners (F) (labeled in FIG. 17) can fasten each of the first and second interface spacers 360, 380 respectively, through apertures 321*a*, 321*b* to the first end 352 and the second end 354 of the coolant crossover 350. Each of the first and second interface spacers 360, 380 can also include additional through apertures 326, 327, respectively, at positions aligned with through apertures in the coolant crossover 350 for receipt of a fastener that will connect the intake manifold assembly 300 to an engine.

Each of the interface spacers 360 and 380 can be molded, machined, thermoformed, 3-D printed, or made using sintering methods with any of the chemically resistant materials discussed above.

The intake manifolds disclosed herein have several advantages. One advantage is that the chemically resistant material used for the inserts will prevent a coolant leak, the inserts will not erode from exposure to glycol. Another advantage is that the intake manifolds enable the reuse of the existing coolant crossover, which provides a cost savings during replacement of the intake manifold. Moreover, the inserts and interface spacers provide a simpler mold for the intake manifold and a completely separated interface for the water crossover requiring less geometrical tolerance precision for the intake manifold itself.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. An intake manifold for an internal combustion engine, the intake manifold comprising:

a main body having a first set of runners extending in a first direction therefrom and a second set of runners extending in an opposite direction therefrom, wherein both the first set of runners and the second set of runners each terminate at a back end with a flange that defines a socket configured to receive an insert; wherein the back end is opposite a coolant cross-over connection end;

a first insert configured as a port cap having a bottom surface defining a first perimeter recess configured to receive a first sealing member and has a top surface from which an elongate spout extends, the first insert being seated in the socket of the first set of runners with the spout inserted into the first set of runners;

a second insert configured as a port cap and having a bottom surface defining a second perimeter recess configured to receive a second sealing member, the second insert being seated in the socket of the second set of runners;

wherein the top surface of the first insert includes a fastener post and the flange of the first set of runners includes a hole for receipt of the fastener post, wherein the fastener post attaches by a deformation fit, and/or the top surface of the second insert includes a fastener post and the flange of the second set of runners includes a hole for receipt of the fastener post, wherein the fastener post attaches by a deformation fit;

wherein the first insert and the second insert are each made of a material that is chemically resistant to coolant fluid.

2. The intake manifold of claim 1, further comprising a first spacer having a first registration feature for seating against the coolant cross-over connection end of the first set of runners, the first spacer being configured to attach to a first end of a coolant crossover; and a second spacer having a second registration feature for seating against the coolant cross-over connection end of the second set of runners, the second spacer being configured to attach to a second end of the coolant crossover; wherein the first spacer defines a through-port and has a top surface defining a third perimeter recess about the through-port configured to receive a third sealing member and a bottom surface defining a fourth perimeter recess about the through-port configured to receive a fourth sealing member, wherein the second spacer defines dual through-ports and has a top surface defining a fifth perimeter recess about and between the dual through-ports configured to receive a fifth sealing member and a bottom surface defining a sixth perimeter recess that about and between the dual through-ports configured to receive a sixth sealing member, and the first spacer and the second spacer are each made of a material that is chemically resistant to coolant fluid.

3. The intake manifold of claim 1, wherein the top surface of the first insert includes the fastener post and the flange of the first set of runners includes the mating hole for receipt of the fastener post for a deformation fit therewith.

4. The intake manifold of claim 3, wherein the elongate spout of the first insert is open for fluid flow therethrough.

5. The intake manifold of claim 1, wherein the top surface of the second insert includes the fastener post and the flange of the second set of runners includes the mating hole for receipt of the fastener post for a deformation fit therewith.

6. The intake manifold of claim 1, wherein the first insert and the second insert are made of polyphenylene sulfide or are made of metal or metal alloy, and the main body is made of a polyamide or polypropylene.

7. The intake manifold of claim 1, wherein the bottom surface of the second insert has an outer wall having a beginning and an end and an endless inner wall defining the recess.

8. The intake manifold as claimed in claim 2, further comprising:

a coolant crossover juxtaposed to and attached or integral with the main body, wherein the coolant crossover has a first end more proximate the first set of runners and a second end more proximate the second set of runners, and the first spacer is sealingly seated against the first end of the coolant crossover and the second spacer is sealing seated against the second end of the coolant crossover.

9. The intake manifold for an internal combustion engine, the intake manifold comprising:

a main body having a first set of runners extending in a first direction therefrom and a second set of runners extending in an opposite direction therefrom, wherein both the first set of runners and the second set of runners each terminate at a back end with a first flange that defines a socket configured to receive an insert and each terminate at a front end with a second flange that defines a socket configured to receive an additional insert; wherein the back end is opposite a coolant cross-over connection end;

a first insert configured as a port cap having a bottom surface defining a first insert perimeter recess configured to receive a first sealing member and has a top surface from which an elongate spout extends, the first insert being seated in the socket of the first flange of the first set of runners with the spout inserted into the first set of runners;

a second insert configured as a port cap and having a bottom surface defining a second insert perimeter recess configured to receive a second sealing member, the second insert being seated in the socket of the first flange of the second set of runners;

wherein the top surface of the first insert includes a fastener post and the flange of the first set of runners includes a hole for receipt of the fastener post, wherein the fastener post attaches by a deformation fit, and/or the top surface of the second insert includes a fastener post and the flange of the second set of runners includes a hole for receipt of the fastener post, wherein the fastener post attaches by a deformation fit;

a first of the additional inserts is seated in the second flange of the first set of runners, the first additional insert defines an open port and has a top surface defining a first perimeter recess about the open port configured to receive a third sealing member and a bottom surface defining a second perimeter recess about the open port configured to receive a fourth sealing member; and a second of the additional inserts is seated in the second flange of the second set of runners, the second additional insert defines a dual port and has a top surface defining a third perimeter recess about the dual ports configured to receive a fifth sealing member and a bottom surface defining a fourth perimeter recess that surrounds and extends between the ports of the dual port configured to receive a sixth sealing member;

wherein the first and second inserts and the first and second additional inserts are made of a material that is chemically resistant to coolant fluid.

10. The intake manifold as claimed in claim 8, wherein the first and second additional inserts each have a key-keyway or keyway-key connection to the respective socket.

11. The intake manifold as claimed in claim 8, wherein the first and second additional inserts have a deformation fit in the socket.

12. The intake manifold as claimed in claim 8, wherein the top surface of the first and second additional inserts and a top surface of their respective flanges of the intake manifold are configured to mate with a coolant crossover.

13. The intake manifold of claim 8, wherein the first and second additional inserts are made of polyphenylene sulfide or are made of metal or metal alloy, and the main body is made of a polyamide or polypropylene.

14. The intake manifold as claimed in claim 8, further comprising:

a coolant crossover juxtaposed to and attached or integral with the main body, wherein the coolant crossover has a first end more proximate the first set of runners and a second end more proximate the second set of runners, and the first additional insert is sealingly seated against the coolant crossover and the second additional insert is sealing seated against the coolant crossover.

15. A kit comprising:

a first insert configured as a port cap having a bottom surface defining a first perimeter recess configured to receive a first sealing member;

one or both of (i) a second insert configured as a port cap and having a bottom surface defining a second perimeter recess configured to receive a second sealing member, wherein the top surface of the first insert includes a fastener post and the flange of the first set of runners includes a hole for receipt of the fastener post, wherein the fastener post attaches by a deformation fit, and/or the top surface of the second insert includes a fastener post and the flange of the second set of runners includes a hole for receipt of the fastener post, wherein the fastener post attaches by a deformation fit; and an intake manifold comprising a main body having a first set of runners extending in a first direction therefrom and a second set of runners extending in an opposite direction therefrom, wherein both the first set of runners and the second set of runners each terminate at a back end with a flange that defines a socket configured to receive one of the first inserts and one of the second inserts, respectively, wherein the back end is opposite a coolant cross-over connection end;

wherein the first insert and the second insert are made of a material that is chemically resistant to coolant fluid.

16. The kit of claim 15, wherein the first insert has a top surface from which an elongate spout extends, the elongate spout being open or closed.

17. The kit of claim 15, further comprising the first sealing member and the second sealing member.

18. The kit of claim 15, further comprising a first spacer configured to attach to a first end of a coolant crossover; and a second spacer configured to attach to a second end of the coolant crossover, wherein the first spacer and second spacer are each made of a material that is chemically resistant to coolant fluid;

wherein the first spacer defines a through-port and has a top surface defining a third perimeter recess about the through-port configured to receive a third sealing member and a bottom surface defining a fourth perimeter recess about the through-port configured to receive a fourth sealing member;

wherein the second spacer defines dual through-ports and has a top surface defining a fifth perimeter recess about and between the dual through-ports configured to receive a fifth sealing member and a bottom surface defining a sixth perimeter recess that about and between the dual through-ports configured to receive a sixth sealing member.

19. The kit of claim 18, further comprising a plurality of sealing members, one each configured to seat in one of the first through sixth perimeter recesses.

20. The kit of claim 15, further comprising a coolant crossover attachable or integral with the main body of the intake manifold.

* * * * *